(12) United States Patent
Bush (10) Patent No.: US 10,755,686 B2
(45) Date of Patent: Aug. 25, 2020

(54) ALUMINIZED FACED NONWOVEN MATERIALS

(71) Applicant: Zephyros, Inc., Romeo, MI (US)

(72) Inventor: Kendall Bush, Macomb, MI (US)

(73) Assignee: Zephyros, Inc., Romeo, MI (US)

( * ) Notice: Subject to any disclaimer, the term of this patent is extended or adjusted under 35 U.S.C. 154(b) by 309 days.

(21) Appl. No.: 15/544,731

(22) PCT Filed: Jan. 20, 2016

(86) PCT No.: PCT/US2016/014068
§ 371 (c)(1),
(2) Date: Jul. 19, 2017

(87) PCT Pub. No.: WO2016/118587
PCT Pub. Date: Jul. 28, 2016

(65) Prior Publication Data
US 2018/0005620 A1    Jan. 4, 2018

Related U.S. Application Data

(60) Provisional application No. 62/105,341, filed on Jan. 20, 2015.

(51) Int. Cl.
*G10K 11/168* (2006.01)
*B32B 5/02* (2006.01)
(Continued)

(52) U.S. Cl.
CPC ............ *G10K 11/168* (2013.01); *B32B 3/266* (2013.01); *B32B 5/022* (2013.01); *B32B 5/26* (2013.01);
(Continued)

(58) Field of Classification Search
CPC ....... G10K 11/168; B32B 3/266; B32B 5/022; B32B 7/02; B32B 7/06; B32B 7/12;
(Continued)

(56) References Cited

U.S. PATENT DOCUMENTS 3,061,491 A    10/1962  Sherrard
3,087,571 A     4/1963  Kerwin, Jr.
(Continued)

FOREIGN PATENT DOCUMENTS

AU         782550 B2      1/2001
AU     2005203796 A1     10/2005
(Continued)

OTHER PUBLICATIONS

3M extreme mounting tape (Year: 2019).*
(Continued)

*Primary Examiner* — Forrest M Phillips
(74) *Attorney, Agent, or Firm* — The Dobrusin Law Firm, P.C.

(57) ABSTRACT

An acoustic material comprising one or more acoustic composite layers; and a facing layer, wherein the one or more acoustic composite layers are formed of a nonwoven sound absorption material; wherein the facing layer is permeable; and wherein the facing layer is attached to a top surface of the one or more acoustic composite layers. The facing layer may optionally include metallic components or a metallized outer surface. The acoustic material may optionally include a pressure sensitive adhesive material on an opposing side of the one or more acoustic composite Sayers to enable installation of the acoustic material. The facing layer may include a permeable scrim, a perforated film, or a perforated foil. The facing layer may be metalized on its top exposed surface to provide infrared heat reflection, and a corrosion resistant coating may be applied on top of the metalized layer if required to stabilize the metal coating.

20 Claims, 2 Drawing Sheets

(51) Int. Cl.
  *B32B 5/26*    (2006.01)
  *B32B 7/06*    (2019.01)
  *B32B 7/14*    (2006.01)
  *B32B 15/14*   (2006.01)
  *B32B 15/20*   (2006.01)
  *B32B 27/12*   (2006.01)
  *B32B 3/26*    (2006.01)
  *B32B 7/02*    (2019.01)
  *B32B 7/12*    (2006.01)

(52) U.S. Cl.
  CPC ............... *B32B 7/02* (2013.01); *B32B 7/06* (2013.01); *B32B 7/12* (2013.01); *B32B 7/14* (2013.01); *B32B 15/14* (2013.01); *B32B 15/20* (2013.01); *B32B 27/12* (2013.01); *B32B 2307/102* (2013.01); *B32B 2307/416* (2013.01); *B32B 2307/724* (2013.01); *B32B 2419/00* (2013.01); *B32B 2605/00* (2013.01)

(58) Field of Classification Search
  CPC .......... B32B 7/14; B32B 15/14; B32B 15/20; B32B 27/12; B32B 2307/102; B32B 2307/416; B32B 2307/724; B32B 2419/00; B32B 2605/00
  USPC ....................................................... 181/290
  See application file for complete search history.

(56) References Cited

U.S. PATENT DOCUMENTS

| | | |
|---|---|---|
| 3,160,549 A | 12/1964 | Caldwell et al. |
| 3,193,049 A | 7/1965 | Wollek |
| 3,205,972 A | 9/1965 | Stricker |
| 3,214,323 A | 10/1965 | Russell et al. |
| 3,386,527 A | 6/1968 | Daubert et al. |
| 3,523,859 A | 8/1970 | Komp |
| 3,642,554 A | 2/1972 | Hensley |
| 3,899,380 A | 8/1975 | Pihlstrom |
| 3,978,179 A | 8/1976 | Sundhauss |
| 3,994,363 A | 11/1976 | Hirao et al. |
| 4,050,913 A | 9/1977 | Roach |
| 4,096,007 A | 6/1978 | Braunling |
| 4,129,675 A | 12/1978 | Scott |
| 4,131,664 A | 12/1978 | Flowers et al. |
| 4,152,474 A | 5/1979 | Cook et al. |
| 4,287,255 A | 9/1981 | Wong et al. |
| 4,299,223 A | 11/1981 | Cronkrite |
| 4,392,522 A | 7/1983 | Bschorr |
| 4,399,851 A | 8/1983 | Bschorr |
| 4,705,715 A | 11/1987 | DeCoste, Jr. et al. |
| 4,830,140 A | 5/1989 | Fridh et al. |
| 4,888,234 A | 12/1989 | Smith et al. |
| 4,988,551 A | 1/1991 | Zegler |
| 5,004,549 A | 4/1991 | Woods et al. |
| 5,068,001 A | 11/1991 | Haussling |
| 5,128,386 A | 7/1992 | Rehmer et al. |
| 5,298,694 A | 3/1994 | Thmpson et al. |
| 5,401,567 A | 3/1995 | Knobloch |
| 5,410,111 A | 4/1995 | Stief et al. |
| 5,459,291 A | 10/1995 | Haines et al. |
| 5,492,580 A | 2/1996 | Frank |
| 5,493,081 A | 2/1996 | Manigold |
| 5,496,603 A | 3/1996 | Riedel et al. |
| 5,504,282 A | 4/1996 | Pizzirusso et al. |
| 5,550,338 A | 8/1996 | Hielscher |
| 5,560,204 A | 10/1996 | Ishihama et al. |
| 5,613,942 A | 3/1997 | Lucas et al. |
| 5,635,270 A | 6/1997 | Fletcher |
| 5,721,177 A | 2/1998 | Frank |
| 5,733,824 A | 3/1998 | Brunka et al. |
| 5,736,470 A | 4/1998 | Schneberger et al. |
| 5,741,829 A | 4/1998 | Reich et al. |
| 5,745,434 A | 4/1998 | Cushman |
| 5,747,131 A | 5/1998 | Kreckel |
| 5,773,080 A | 6/1998 | Simmons et al. |
| 5,773,375 A | 6/1998 | Swan et al. |
| 5,824,973 A | 10/1998 | Haines et al. |
| 5,832,685 A | 11/1998 | Hermanson |
| 5,841,081 A | 11/1998 | Thompson et al. |
| 5,861,348 A | 1/1999 | Kase |
| 5,866,235 A | 2/1999 | Fredrick et al. |
| 5,886,306 A | 3/1999 | Patel et al. |
| 5,906,883 A | 5/1999 | Blanc-Brude |
| 5,955,174 A | 9/1999 | Wadsworth et al. |
| 5,968,629 A | 10/1999 | Masui et al. |
| 5,981,411 A | 11/1999 | Brown |
| 6,008,149 A | 12/1999 | Copperwheat |
| 6,048,809 A | 4/2000 | Brow et al. |
| 6,102,465 A | 8/2000 | Nemoto et al. |
| 6,103,180 A | 8/2000 | Haeseker et al. |
| 6,145,617 A | 11/2000 | Alts |
| 6,165,921 A | 12/2000 | Nagata et al. |
| 6,198,016 B1 | 3/2001 | Lucast et al. |
| 6,204,209 B1 | 3/2001 | Rozek et al. |
| 6,220,388 B1 | 4/2001 | Sanborn |
| 6,238,761 B1 | 5/2001 | Jeong et al. |
| 6,244,314 B1 | 6/2001 | Dodt et al. |
| 6,256,600 B1 | 7/2001 | Bolton et al. |
| 6,296,075 B1 | 10/2001 | Gish et al. |
| 6,312,542 B1 | 11/2001 | Nagata et al. |
| 6,345,688 B1 | 2/2002 | Veen et al. |
| 6,376,396 B1 | 4/2002 | Thorn et al. |
| 6,378,179 B1 | 4/2002 | Hirsch |
| 6,390,563 B1 | 5/2002 | Haverkamp et al. |
| 6,410,464 B1 | 6/2002 | Menzies et al. |
| 6,419,729 B1 | 7/2002 | Duffy et al. |
| 6,429,154 B1 | 8/2002 | Trotter |
| 6,495,229 B1 | 12/2002 | Carte et al. |
| 6,514,889 B1 | 2/2003 | Theoret et al. |
| 6,524,691 B2 | 2/2003 | Sugawara et al. |
| 6,534,145 B1 | 3/2003 | Boyles |
| 6,541,105 B1 | 4/2003 | Park |
| 6,598,636 B1 | 7/2003 | Schurmann et al. |
| 6,755,483 B2 | 6/2004 | Yukawa et al. |
| 6,821,597 B1 | 11/2004 | Price et al. |
| 6,913,718 B2 | 7/2005 | Ducker et al. |
| 7,201,253 B2 | 4/2007 | Duval et al. |
| 7,226,656 B2 | 6/2007 | Coates et al. |
| 7,470,339 B2 | 12/2008 | Hoffmann et al. |
| 7,514,026 B1 | 4/2009 | Zafiroglu |
| 7,757,810 B2 | 7/2010 | Sparks et al. |
| 7,757,811 B2 | 7/2010 | Fox et al. |
| 7,867,601 B2 | 1/2011 | Ikishima et al. |
| 8,153,219 B2 | 4/2012 | Hooft |
| 8,365,862 B2 | 2/2013 | Coates et al. |
| 8,418,806 B1 * | 4/2013 | Wyerman ............ G10K 11/002 181/284 |
| 8,534,419 B2 | 9/2013 | Coates et al. |
| 2001/0000162 A1 | 4/2001 | Fletemier et al. |
| 2001/0015249 A1 | 8/2001 | Mohr |
| 2001/0023008 A1 | 9/2001 | Offermann et al. |
| 2002/0011306 A1 | 1/2002 | Hannington et al. |
| 2002/0015842 A1 | 2/2002 | Yanagiuchi |
| 2002/0033215 A1 | 3/2002 | Aoki |
| 2003/0066708 A1 | 4/2003 | Allison et al. |
| 2003/0068943 A1 | 4/2003 | Fay |
| 2003/0099810 A1 | 5/2003 | Allison et al. |
| 2003/0188817 A1 | 10/2003 | Yukawa et al. |
| 2004/0021247 A1 | 2/2004 | Habisreitinger et al. |
| 2004/0077738 A1 | 4/2004 | Field et al. |
| 2004/0111817 A1 | 6/2004 | Chen et al. |
| 2004/0131836 A1 | 7/2004 | Thompson |
| 2004/0173298 A1 | 9/2004 | Boiocchi et al. |
| 2004/0176003 A1 | 9/2004 | Yang et al. |
| 2004/0180177 A1 | 9/2004 | Ray et al. |
| 2004/0180592 A1 | 9/2004 | Ray |
| 2004/0231915 A1 | 11/2004 | Thompson, Jr. et al. |
| 2004/0238275 A1 | 12/2004 | Keller et al. |
| 2005/0084641 A1 | 4/2005 | Downs et al. |
| 2005/0211358 A1 | 9/2005 | Tanno |
| 2006/0090958 A1 | 5/2006 | Coates et al. |
| 2006/0105664 A1 | 5/2006 | Zafiroglu |

(56) References Cited

U.S. PATENT DOCUMENTS

| | | |
|---|---|---|
| 2006/0124387 A1 | 6/2006 | Berbner et al. |
| 2006/0137799 A1 | 6/2006 | Haque et al. |
| 2006/0289230 A1 | 12/2006 | Connelly et al. |
| 2006/0289231 A1 | 12/2006 | Priebe et al. |
| 2007/0190871 A1 | 8/2007 | Patel |
| 2007/0277948 A1 | 12/2007 | Carbo et al. |
| 2008/0001431 A1* | 1/2008 | Thompson ............... B32B 5/26 296/187.01 |
| 2008/0050565 A1 | 2/2008 | Gross et al. |
| 2008/0064794 A1 | 3/2008 | Murdock et al. |
| 2008/0073146 A1 | 3/2008 | Thompson et al. |
| 2008/0166940 A1 | 7/2008 | Nunn et al. |
| 2008/0233348 A1 | 9/2008 | Ishiwatari et al. |
| 2008/0251187 A1 | 10/2008 | Haque et al. |
| 2008/0296087 A1 | 12/2008 | Tanaka et al. |
| 2008/0311363 A1 | 12/2008 | Haskett et al. |
| 2009/0071322 A1 | 3/2009 | Oxford et al. |
| 2009/0148644 A1 | 6/2009 | Francis |
| 2009/0162595 A1 | 6/2009 | Ko et al. |
| 2009/0255619 A1 | 10/2009 | Tong |
| 2010/0000640 A1 | 1/2010 | Kierzkowski et al. |
| 2010/0021667 A1 | 1/2010 | Yanagawa |
| 2010/0168286 A1 | 7/2010 | Gladfelter et al. |
| 2010/0270101 A1 | 10/2010 | Yukawa |
| 2010/0304109 A1 | 12/2010 | Schilling et al. |
| 2011/0004414 A1 | 1/2011 | McKim |
| 2011/0070794 A1 | 3/2011 | Gladfelter et al. |
| 2011/0082386 A1 | 4/2011 | Sheraton, Sr. |
| 2011/0114414 A1 | 5/2011 | Bliton et al. |
| 2011/0139542 A1* | 6/2011 | Borroni ............... B32B 3/266 181/290 |
| 2011/0139543 A1 | 6/2011 | Coates et al. |
| 2011/0159236 A1 | 6/2011 | Nakae et al. |
| 2011/0226547 A1 | 9/2011 | Kühl et al. |
| 2011/0274921 A1 | 11/2011 | Li et al. |
| 2011/0293911 A1 | 12/2011 | Coates et al. |
| 2012/0024626 A1 | 2/2012 | Coates et al. |
| 2012/0037447 A1 | 2/2012 | Deval et al. |
| 2012/0058289 A1 | 3/2012 | Coates et al. |
| 2013/0112499 A1 | 5/2013 | Kitchen et al. |
| 2013/0192921 A1 | 8/2013 | Coates et al. |
| 2013/0209782 A1* | 8/2013 | Kipp ............... C04B 28/26 428/313.3 |
| 2013/0319791 A1* | 12/2013 | Stopin ............... C08L 95/00 181/290 |
| 2013/0327590 A1 | 12/2013 | Grube et al. |
| 2014/0050886 A1 | 2/2014 | Burgin et al. |
| 2014/0202788 A1* | 7/2014 | Hansen ............... E04B 1/84 181/290 |
| 2014/0332313 A1* | 11/2014 | Bischoff ............... G10K 11/168 181/290 |
| 2015/0232044 A1* | 8/2015 | Demo ............... B60R 13/08 181/290 |
| 2015/0364730 A1 | 12/2015 | Glaspie |
| 2016/0118033 A1* | 4/2016 | Owen, Jr. ............... G10K 11/16 181/290 |

FOREIGN PATENT DOCUMENTS

| | | |
|---|---|---|
| CA | 2350477 A1 | 5/2000 |
| CA | 2421458 A1 | 4/2004 |
| CN | 102124169 A | 7/2011 |
| CN | 1980789 B | 2/2012 |
| CN | 202320527 U | 5/2012 |
| CN | 202293535 U | 7/2012 |
| CN | 103443342 A | 12/2013 |
| DE | 6930307 U | 12/1969 |
| DE | 19508335 A1 | 11/1995 |
| DE | 4424328 A1 | 1/1996 |
| DE | 10345575 B3 | 1/2005 |
| DE | 102004016934 A1 | 10/2005 |
| DE | 19714348 A1 | 2/2008 |
| DE | 102011079413 A1 | 1/2013 |
| EP | 0486427 A1 | 5/1992 |
| EP | 0607946 B1 | 7/1994 |
| EP | 0909680 A1 | 4/1999 |
| EP | 0911185 A2 | 4/1999 |
| EP | 0949066 A2 | 10/1999 |
| EP | 1577123 B1 | 9/2005 |
| EP | 1640207 A1 | 3/2006 |
| EP | 1775714 A1 | 4/2007 |
| EP | 2312073 A1 | 4/2011 |
| GB | 823203 A | 11/1959 |
| GB | 2079626 A | 1/1982 |
| GB | 2322862 A | 9/1998 |
| GB | 2421251 A | 6/2006 |
| JP | S56-38080 A | 9/1982 |
| JP | S60-137528 U | 9/1985 |
| JP | 63-11541 U | 1/1988 |
| JP | 02302484 A | 12/1990 |
| JP | H05-113020 A | 7/1993 |
| JP | 7266802 A | 10/1995 |
| JP | H08-223855 A | 8/1996 |
| JP | H10-121597 A | 5/1998 |
| JP | H10-156994 A | 6/1998 |
| JP | H10148909 A | 6/1998 |
| JP | H10237978 A | 9/1998 |
| JP | H10-273900 A | 10/1998 |
| JP | H10280259 A | 10/1998 |
| JP | H11508328 A | 7/1999 |
| JP | 2000-310023 A | 7/2000 |
| JP | 2001-228879 A | 8/2001 |
| JP | 2001-348540 A | 12/2001 |
| JP | 2002-052634 A | 2/2002 |
| JP | 2002-067608 A | 3/2002 |
| JP | 2004-107605 | 8/2004 |
| JP | 2004-291549 A | 10/2004 |
| JP | 2005036364 A | 2/2005 |
| JP | 2005076144 A | 3/2005 |
| JP | 2006104298 A | 4/2006 |
| JP | 2006-160197 A | 6/2006 |
| JP | 2006143867 A | 6/2006 |
| JP | 2006160197 A1 | 6/2006 |
| JP | 2006193838 A | 7/2006 |
| JP | 2006273909 A | 10/2006 |
| JP | 2007025044 A | 1/2007 |
| JP | 2007-512990 A | 5/2007 |
| JP | 2007223273 A | 6/2007 |
| JP | 2008/068799 A | 3/2008 |
| JP | 2008/132972 A | 6/2008 |
| WO | 8809406 A1 | 12/1988 |
| WO | 93/23596 A1 | 11/1993 |
| WO | 94/03343 A1 | 2/1994 |
| WO | 95/25634 A1 | 9/1995 |
| WO | 97/00989 A1 | 1/1997 |
| WO | 97/04445 A1 | 2/1997 |
| WO | 98/18656 A1 | 5/1998 |
| WO | 98/38370 A1 | 9/1998 |
| WO | 98/53444 A1 | 11/1998 |
| WO | 99/61963 A1 | 12/1999 |
| WO | 0027671 A | 5/2000 |
| WO | 2000/032142 A1 | 6/2000 |
| WO | 00/53456 A1 | 9/2000 |
| WO | 2001/019306 A1 | 3/2001 |
| WO | 02/09089 A1 | 1/2002 |
| WO | 02085648 A1 | 10/2002 |
| WO | 02098643 A2 | 12/2002 |
| WO | 2003/000976 A1 | 1/2003 |
| WO | 03069596 A1 | 8/2003 |
| WO | 03074267 A1 | 9/2003 |
| WO | 03/097227 A1 | 11/2003 |
| WO | 2005/081226 A1 | 9/2005 |
| WO | 2006/107847 A2 | 10/2006 |
| WO | 2007/125830 A1 | 8/2007 |
| WO | 2009/039900 A1 | 4/2009 |
| WO | 2010/042995 A1 | 4/2010 |
| WO | 2010/063079 A1 | 6/2010 |
| WO | 2010/094897 A2 | 8/2010 |

(56) References Cited

FOREIGN PATENT DOCUMENTS

WO    2012/038737 A1    3/2012
WO    2017028962 A1    2/2017

OTHER PUBLICATIONS

Chinese Office Action for Chinese Patent Application No. 201680006135.6; dated Aug. 30, 2018.
Chinese Office Action for Chinese Patent Application No. 201680006135,6; dated May 13, 2019.
European Office Action for European Application No. 16703879.3 dated Apr. 19, 2018.
International Search Report and Written Opinion for International Patent Application No. PCT/US2016/014068, dated May 2, 2016.
Acoustic Textiles—Lighter, Thinner and More Sound-Absorbent, Technical Textiles International, International Newsletters, dated Sep. 2002, pp. 15-18.
Bies Reference 1 of 7; Engineering Noise Control Theory and Practice; $3^{rd}$ Edition (2003).
Bies Reference 2 of 7; Engineering Noise Control Theory and Practice; $3^{rd}$ Edition (2003).
Bies Reference 3 of 7; Engineering Noise Control Theory and Practice; $3^{rd}$ Edition (2003).
Bies Reference 4 of 7; Engineering Noise Control Theory and Practice; $3^{rd}$ Edition (2003).
Bies Reference 5 of 7; Engineering Noise Control Theory and Practice; $3^{rd}$ Edition (2003).
Bies Reference 6 of 7; Engineering Noise Control Theory and Practice; $3^{rd}$ Edition (2003).
Bies Reference 7 of 7; Engineering Noise Control Theory and Practice; $3^{rd}$ Edition (2003).
DEC1-TEX 3D, URL = http://web.archive.org/web/20070830042658 http://www.inccorp.com/au/page/deci_tex_3d.html#top, including nine (9) documents from links therein, download date Aug. 26, 2011.
Natural Fiber Based Lightweight Sound Absorber Materials, SAE Technical Paper Series, Jeffrey S. Hurley, Buckeye Technologies Inc., dated May 2007.
Notes on Sound Absorption Technology, Uno Ingard (1994).

* cited by examiner

ALUMINIZED FACED NONWOVEN MATERIALS

FIELD

The present teachings relate generally to materials for thermo-acoustic applications, and more specifically, to aluminized faced nonwoven materials for reflecting radiation and absorbing sound.

BACKGROUND

Industry is constantly seeking new and/or improved materials and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the engine compartment of the vehicle.

Traditional sound absorbing materials may have a low temperature resistance, and therefore cannot be installed in areas where the material would be exposed to heat, as they are not capable of withstanding high temperatures. In applications where there are high levels of radiant heat generation, such as within the engine compartment of an internal combustion engine where exhaust and turbo charger components generate significant amounts of thermal radiation, there is a risk that the material will absorb significant amounts of heat and sag, melt, or even catch fire. Certain sound absorbing materials have also been shown to degrade upon exposure to moisture and other engine/powertrain fluids. These sound absorbing materials, therefore, cannot be used alone in all areas where sound absorption is desired.

Therefore, it is desirable to provide improved noise reduction in a variety of applications, such as through improved sound absorption materials. There is also a desire for noise reduction, such as through sound absorption materials that can withstand higher temperatures, such as in applications of high levels of radiant heat generation, that can provide localized heat reflection, or both.

Accordingly, the present teachings provide for a nonwoven material that meets the desires stated herein through the use of an acoustic material having one or more acoustic composite layers (e.g., a lofted porous bulk absorber), a facing layer (which may be permeable, metalized, metallic, or a combination thereof). The present teachings also provide for the method of assembling this acoustic material.

SUMMARY

The present teachings meet one or of the above needs by the improved devices and methods described herein.

The present teachings may include an acoustic material having any of the characteristics, elements, or properties as described herein or any combination of these characteristics, elements, or properties. The acoustic material may comprise one or more acoustic composite layers (engineered 3D structures). The acoustic material may comprise a facing layer. The one or more acoustic composite layers may be formed of a nonwoven sound absorption material. The facing layer may be permeable. The facing layer may optionally include metallic components or a metallized outer surface. The facing layer may attached to a top surface of the one or more acoustic composite layers. The one or more acoustic composite layers may include a lofted porous bulk absorber (engineered 3D structure). The facing layer may be made permeable by a plurality of perforations in the facing layer. The facing layer may be laminated to the one or more acoustic composite layers. The facing layer may be attached to the top surface of the one or more acoustic composite layers by a high temperature adhesive layer. The facing layer may be attached to the top surface of the one or more acoustic composite layers by an adhesive. The adhesive may be applied in such a way that it does not plug the perforations of the facing layer. The facing layer may be any of a scrim, a fabric, a film, or a foil. For example, the facing layer may be a perforated reinforced aluminum foil, a perforated polyester film, or a fibrous permeable fabric. The facing layer may be metalized (e.g., aluminized) to provide infrared heat reflection. This may be performed by depositing metal (e.g., aluminum) ions onto the surface of the facing layer. The facing layer may have a thickness of about 0.0001 inches to about 0.25 inches. The facing on the acoustic material may be coated with other coatings, such as a corrosion resistant coating. The acoustic material may further comprise a pressure sensitive adhesive on a rear surface of the one or more acoustic composite layers. The pressure sensitive adhesive may include a removable release liner for adhering the acoustic material to a substrate. The acoustic material may reflect heat, provide significant broad-band sound absorption, or may provide both in one product.

The present teachings also include a method of assembling an acoustic material. It is contemplated that the method steps may be performed in any order. The method may comprise the steps of: forming one or more acoustic composite layers, wherein the one or more acoustic composite layers is a nonwoven sound absorption material; providing and/or modifying a facing layer; and securing (e.g., adhering) the facing layer to a top side of the one or more acoustic composite layers. The modifying step may include metalizing the facing layer (e.g., aluminizing) by depositing metal atoms onto a surface of the facing layer; perforating the facing layer so that the facing layer is permeable; or both. The adhering step may include laminating the facing layer to the one or more acoustic composite layers. The method may further include attaching a pressure sensitive adhesive material to a bottom side of the acoustic composite layer. The pressure sensitive adhesive material may include a release liner. The method may further include removing the release liner from the pressure sensitive adhesive material and attaching the pressure sensitive adhesive material to a desired substrate.

Therefore, the present teachings may include an acoustic material including acoustically tuned airflow resistive facings utilizing infrared radiation reflective technology and an acoustic composite based on carded/lapped fiber technology or air laid technology to enable the acoustic material to reflect heat and to provide broadband sound absorption within the same composite material.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Acoustic materials, such as acoustic composite materials and/or metalized faced acoustic materials like the materials as discussed herein, may have a wide range of applications, such as where sound absorption and/or insulation is desired. For example, and not to serve as limiting, acoustic materials may be used in automotive applications, generator set engine compartments, commercial vehicle engines, in-cab areas, architectural applications, and even heating, ventilating and air conditioning (HVAC) applications. The acoustic materials may be suitable for (but not limited to) use as sound attenuation materials in vehicles, attenuating sound originating from outside a cabin of a motor vehicle and propagating toward the inside of the cabin. Acoustic materials may be used for machinery and equipment insulation, motor vehicle insulation, domestic appliance insulation, dishwashers, and commercial wall and ceiling panels. The acoustic materials may be used in the engine cavity of a vehicle, on the inner and outer dash panels and under the carpeting in the cabin, for example. The acoustic material may be used inside cabs near sheet metal surfaces to provide acoustic absorption and to lower the heat flow between the outside environment and the inside of the vehicle cab (which may also provide a lower demand on the vehicle's HVAC system). The acoustic material may be used as interior decorative trim, in which case it may be desirable to face the acoustic sheet with some form of decorative fabric or other covering. The acoustic sheets may be used in combination with other sound absorption materials. The acoustic material may also be useful as an acoustic pin board material or as a ceiling tile.

Composite products, such as composite acoustic materials, may be formed, at least in part, from porous limp sheets with relatively high air flow resistances, porous bulk absorbers or spacer materials having air flow resistances substantially smaller than the limp sheets, or both. Methods for producing such composite products include those set out in co-owned International Application No. PCT/AU2005/000239 entitled "Thermoformable Acoustic Product" (published as WO/2005/081226), the contents of which is hereby incorporated herein by reference.

In general, materials used for sound absorption (e.g., composite acoustic materials, nonwoven materials, or both) must exhibit air permeability properties. Critical characteristics include air flow resistance (resistance to air flow through the material), tortuosity (the path length of a sound wave within the material), and porosity (void to volume ratio). With fibrous materials, air flow resistance is an important factor controlling sound absorption.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The acoustic material as disclosed herein may be a metalized faced acoustic material. The metalized faced acoustic materials may comprise one or more acoustic composite layers. The one or more acoustic composite layers may be or may include a lofted porous bulk absorber, for example. A facing layer or air flow resistive acoustic facing layer may be laminated or otherwise attached to the acoustic composite layer(s). The facing layer may be metalized (e.g., aluminized) on the top surface to provide infrared (IR) radiant heat reflection, which may protect the underneath acoustic composite layer (e.g., the porous bulk acoustic absorber). Therefore, the present teachings envision an acoustically tuned air flow resistive facing utilizing IR radiation reflective technology to enable an acoustic composite layer based on carded/lapped fiber technology or air laying to reflect heat and to provide broadband sound absorption within the same composite material.

The one or more acoustic composite layers may function to absorb sound to reduce noise. The one or more acoustic composite layers may provide air flow resistance or may exhibit air flow resistance properties. The one or more acoustic composite layers may provide insulation. The one or more acoustic composite layers may support a facing material. The one or more acoustic composite layers may attach directly to a wall or surface of a substrate to provide acoustic absorption. The one or more acoustic composite layers may be any material known to exhibit sound absorption characteristics. The acoustic composite layer may be at least partially formed from fibrous material. The acoustic composite layer may be at least partially formed as a web of material (e.g., a fibrous web). The acoustic composite layer may be formed from nonwoven material, such as short fiber nonwoven materials. The acoustic composite layer may be a porous bulk absorber (e.g., a lofted porous bulk absorber formed by a carding and/or lapping process). The acoustic composite material may be formed by air laying. The acoustic composite layer may be an engineered 3D structure.

Acoustic materials for sound absorption may have a relatively high air flow resistance to present acoustic impedance to the sound pressure wave incident upon the material. Air permeability should be managed to ensure predictable and consistent performance. This may be achieved through management of fiber sizes, types, and lengths, among, other factors. A homogeneous, short fiber nonwoven textile may be desirable. In some applications, desirable levels of air permeability may be achieved by combining plural nonwoven materials of differing densities together to form a composite product. A combination of materials having low permeability with those having high permeability can be used to achieve locally reactive acoustic behavior. One or more of the acoustic materials (e.g., nonwoven materials) may be short fiber technology-based (SFT-based) materials. The SFT-based materials may be formed using gravity deposition or a process similar to air laying. The SFT-based materials may be densified. A SFT-based textile can be advantageous in terms of reducing cost and providing a significant environmental benefit by reducing or eliminating the amount of waste disposed to landfill. The acoustic composite layer may be formed by needle-punching, alone or in combination with any of the methods of forming the layer described herein.

An acoustic composite layer (e.g., nonwoven material) may be formed to have a thickness and density selected according to the required physical and air permeability properties desired of the finished acoustic composite layer. The acoustic composite layer may be any thickness depending on the application, location of installation, shape, fibers used (and the lofting of the acoustic composite layer), or other factors. The density of the acoustic composite layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

A low density acoustic composite material may be designed to have a low density, with a finished thickness of about 1.5 mm or more, about 4 mm or more, about 5 mm or more, about 6 mm or more, or about 8 mm or more. The finished thickness may be about 350 mm or less, about 250 mm or less, about 150 mm or less, about 75 mm or less, or about 50 mm or less. The acoustic composite material may be formed as a relatively thick, low density nonwoven, with a bulk density of 10 kg/m$^3$ or more, about 15 kg/m$^3$ or more, or about 20 kg/m$^3$ or more. The thick, low density nonwoven may have a bulk density of about 200 kg/m$^3$ or less, about 100 kg/m$^3$ or less, or about 60 kg/m$^3$ or less. The acoustic composite material thus formed may have an air flow resistivity of about 400 Rayls/m or more, about 800 Rayls/m or more, or about 100 Rayls/m or more. The acoustic composite material may have an air flow resistivity of about 200,000 Rayls/m or less, about 150,000 Rayls/m or less, or about 100,000 Rayls/m or less. Low density acoustic composite materials may even have an air flow resistivity of up to about 275,000 Rayls/m. Additional sound absorption may also be provided by a facing layer on the acoustic composite layer (e.g., by laminating or otherwise attaching or adhering to a surface of the acoustic composite layer). A facing layer may include air flow resistive fabrics or films that may provide an air flow resistivity of about 275,000 Rayls/m or higher, 1,000,000 Rayls/m or higher, or even 2,000,000 Rayls/m or higher. For example, a facing layer may have a thickness that is about 0.0005 m thick and may have a specific air flow resistance of about 1000 Rayls. Therefore, the air flow resistivity would be about 2,000,000 Rayls/m. In another example, a fabric or film facing layer may have a thickness of about 0.0005 inches, or about 0.013 mm, with a specific air flow resistance of about 1000 Rayls. Therefore air flow resistivity would be about 7,700,000 Rayls/m.

Where the acoustic composite material is a low density material (such as a nonwoven material), the nonwoven material may be used as a porous bulk absorber. In order to form a porous bulk absorber of the desired dimensions, once the nonwoven material is formed, the nonwoven material may be vertically lapped, rotary lapped, or air laid and then thermally bonded. High density nonwoven materials may also be used for a variety of applications, such as, for example, a porous limp sheet. The low and high density nonwoven materials may be used together to form composite materials or products.

The acoustic composite layer material fibers that make up the acoustic composite material/layer may have a linear mass density from about 0.5 to about 25 denier, preferably about 1 to about 6 denier, more preferably about 1 to about 4 denier. The fibers may have a staple length of about 1.5 millimeters or greater, or even up to about 70 millimeters or greater (e.g., for carded fibrous webs). For example, the length of the fibers may be between about 30 millimeters and about 65 millimeters, with an average or common length of about 50 or 51 millimeters staple length, or any length typical of those used in fiber carding processes. Short fibers may be used in some other nonwoven processes, such as the formation of air laid fibrous webs. For example, some or all of the fibers may be a powder-like consistency (e.g., with a fiber length of about 2 millimeters to about 3 millimeters). Fibers of differing lengths may be combined to form the acoustic composite layer. The fiber length may vary depending on the application, the acoustic properties desired, dimensions and/or properties of the acoustic material (e.g., density, porosity, desired air flow resistance, thickness, size, shape, and the like of the acoustic layer), or any combination thereof. More effective packing of the shorter fibers may allow pore size to be more readily controlled in order to achieve desirable acoustic characteristics.

In some applications, the use of shorter fibers may have advantages in relation to the performance of the acoustic material. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibers of the acoustic composite layer material may be natural or synthetic fibers. Suitable natural fibers may include cotton, jute, wool, cellulose and ceramic fibers. Suitable synthetic fibers may include polyester, polypropylene, polyethylene, Nylon, aramid, imide, acrylate fibers, or combination thereof. The acoustic composite layer material may comprise polyester fibers, such as polyethylene terephthalate (PET), and co-polyester/polyester (CoPET/PET) adhesive bi-component fibers. The fibers may be 100% virgin fibers, or may contain fibers regenerated from post-consumer waste (for example, up to about 90% fibers regenerated from postconsumer waste).

The acoustic composite layer material may include a plurality of bi-component fibers. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous web is heated to soften the sheath material of the bi-component may depend upon the physical properties of the sheath material. For a polyethylene sheath, the temperature may be about 140 degrees C. to about 160 degrees C. For a polypropylene sheath, the temperature may be higher (for example, about 180 degrees C.). The bi-component fibers may be formed of short lengths chopped from extruded bi-component fibers. The bi-component fibers may have a sheath-to-core ratio (in cross-sectional area) of about 25% to about 35%.

The fibers may be used to form a thermoformable short fiber nonwoven, which indicates a nonwoven material that may be formed with a broad range of densities and thicknesses and that contains a thermoplastic and/or thermoset binder. The thermoformable short fiber nonwoven material may be heated and thermoformed into a specifically shaped thermoformed product.

The acoustic composite layer fibers may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation.

The fibers forming the acoustic composite layer may be formed into a nonwoven web using nonwoven processes including, for example, blending fibers (e.g., blending bi-component fibers, conventional staple fibers, or combination thereof), carding, air laying, mechanical formation, or combination thereof. The acoustic composite layer material fibers may be opened and blended using conventional processes. The fibers may be blended within the structure of the fibrous web. A carded web may be cross-lapped or vertically lapped, to form a voluminous nonwoven web. The carded web may be vertically lapped according to processes such as "Struto" or "V-Lap", for example. This construction provides a web with relative high structural integrity in the direction of the thickness of the composite sound absorber, thereby minimizing the probability of the web falling apart during application, or in use. Carding and lapping processes create a nonwoven fiber layer that has good compression resistance through the vertical cross-section and enables the production of a lower mass acoustic treatment, especially with lofting to a higher thickness without adding significant amounts of fiber to the matrix. Such an arrangement also provides the ability to achieve a low density web with a relatively low bulk density. An air laid or mechanically formed web may also be produced at the desired thickness and density. The web may then be thermally bonded, air bonded, mechanically consolidated, the like, or combination thereof, to form a cohesive nonwoven insulation material.

The ability of the acoustic materials to absorb sound may be enhanced by applying a facing layer to the top surface of the one or more acoustic composite layers (e.g., a lofted porous bulk absorber). The acoustic composite layer may be protected by the facing layer. The facing layer may function to provide additional air flow resistance (or air flow resistivity) to the acoustic material. The facing layer (e.g., a metallic facing layer or via the metallization of the facing layer) may function to provide heat resistance, heat reflection, support, protection, or combination thereof, to the acoustic composite layer (and the acoustic material in general). The facing layer may be positioned to face the noise and/or heat source, thereby serving as a barrier between the noise and/or heat source and the acoustic composite layer (e.g., a lofted porous bulk absorber). The facing layer may have a thickness of about 0.0001 inch or more, about 0.0002 inches or more, or about 0.0005 inches or more. The facing layer may have a thickness of about 0.5 inches or less, about 0.3 inches or less, or about 0.25 inches or less.

To maintain good acoustic performance, the facing layer may preferably be a permeable material so that sound is not just reflected off of the facing layer and can travel to the acoustic composite layer. The facing layer may be formed from a nonwoven, preformed web; fabric; needle-punched material; the like; or combination thereof. The facing layer may be a nonwoven material. The facing layer may be a woven material, such as a woven fabric. The facing layer may be a permeable scrim. The scrim may be formed of a fibrous permeable fabric. The facing layer may be a generally solid layer (e.g., a metallic layer or a film) made permeable by forming a plurality of openings. The facing layer may be made permeable by methods of creating openings in the layer, such as by perforation, which may permit a greater range of materials to be used as a facing layer. The perforation, for example, of a generally solid layer may then enable permeability (e.g., of air, sound waves, or both) for good acoustic absorption properties. The facing layer may be a film applied to the acoustic composite layer. The film may be a reflective film. The film may be any polymeric film capable of being metalized, for example a polyester (e.g., PET) film. The facing layer may be a foil (e.g., a metallic foil). The foil may be laminated to the acoustic composite layer. For example, the foil may be a laminated reinforced aluminum foil. The film or foil may be perforated prior to or after being applied to the acoustic composite layer.

The openings in the facing layer, e.g., formed by perforation or the openings of a scrim, may be spread across the entire facing layer. The openings or perforations may be generally concentrated in particular areas of the facing layer (e.g., areas where permeability and/or air flow resistance are desired). The perforations may be created in any design or pattern that provides permeability to the facing layer. For example, the perforations may be aligned in rows and/or columns over the facing layer (e.g., creating a generally uniform pattern along the facing layer). The perforations may be arranged in a staggered pattern. The perforations may create open space accounting for approximately 0.1 percent or more of the facing layer, about 1 percent or more of the facing layer, or about 4 percent or more of the facing layer. The perforations may create open space accounting for about 90 percent of the facing layer or less, about 40 percent of the facing layer or less, or about 25 percent of the facing layer or less. The facing layer may be applied over the non-reflective acoustic composite material to provide localized heat reflection without considerably sacrificing the properties of the underneath acoustic composite material and without reducing the acoustic absorption capacity of the existing base material (the one or more acoustic composite layers). To provide heat reflective properties and protect the acoustic composite layer underneath, the facing layer may be metalized or aluminized. The facing layer itself may be metallic (e.g., so that an additional metallization or aluminization step may not be necessary). If a reinforced foil, such as a reinforced aluminum foil-based facing, is used as the facing layer, the metallic foil may be produced by a mill rather than via a deposition process. Metallization or aluminization processes can be performed by depositing metal atoms onto commodity acoustic films and fabrics, which may create reflective variants. As an example, aluminization may be established by applying a layer of aluminum atoms to the surface of the film or scrim facing. As discussed above, the facing layer is permeable to provide acoustic performance. Therefore, the metal atoms deposited on the facing layer may be applied in a thin layer so as not to impact the permeability of the facing layer. For example, if deposited to an already-permeable scrim facing, the surface may be aluminized by depositing aluminum atoms on the surface of the filaments of the scrim at coated thicknesses so low that the permeability of the scrim is unchanged. Metalizing may be performed prior to the application of the facing to the acoustic composite layer. Metalizing may be performed on an assembled acoustic material (e.g., one or more acoustic composite layers and one or more facing layers).

The metallization may provide a desired reflectivity or emissivity. The reflective facing may be about 50% IR reflective or more, about 65% IR reflective or more, or about 80% IR reflective or more. The reflective facing may be about 100% IR reflective or less, about 99% IR reflective or less, or about 98% IR reflective or less. For example, the emissivity range may be about 0.01 to about 0.20, or 99% to about 80% IR reflective, respectively. Emissivity may change over time as oil, dirt, degradation, and the like may impact the facing in the application.

Other coatings may be applied to the top surface of the metallic and/or metalized layer to achieve desired properties. For example, a corrosion resistant coating may be applied to the top surface of the metalized layer to reduce or protect the metal (e.g., aluminum) from oxidizing and/or losing reflectivity.

In assembling the layers as disclosed herein, the facing layer may be laminated to the acoustic composite layer (e.g., a lofted porous bulk absorber). The facing layer may be bonded to the acoustic composite layer with an adhesive, such as a high temperature adhesive layer. The adhesive may be a powder adhesive, an adhesive web or film, a liquid adhesive, or any combination thereof. It may be preferable that the high temperature adhesive layer does not plug the openings of the permeable facing layer so that the facing layer remains permeable for good acoustic properties and to allow the acoustic composite layer to absorb sound. Perforating and/or metalizing/aluminizing steps may be performed prior to the lamination of the facing layer to the acoustic composite layer. Perforating, metalizing/aluminizing, or both, may be performed after the lamination of the facing layer to the acoustic composite layer.

The acoustic material may be tuned for broadband acoustic absorption based on the permeability or specific air flow resistance of the facing layer and the makeup of the acoustic composite layer (e.g., a lofted porous bulk absorber) underneath. The acoustic material may also be designed to provide IR heat reflection. This allows the acoustic material to be installed and used in applications with high temperature areas with localized radiant heat sources. The acoustic material may have a temperature resistance for the intended application. For certain automotive applications, for example, the acoustic material may have a low sag modulus at temperature up to about 150° Celsius or even greater. In engine compartment applications, the acoustic material may exhibit minimal sag at operating temperatures.

Acoustic properties of the acoustic material may be impacted by the shape of the acoustic material. The acoustic material may be generally flat. The acoustic material may be formed into any shape. For example, the acoustic material may be molded to generally match the shape of the area to which it will be installed. The three-dimensional geometry of a molded product may provide additional acoustic absorption. The three-dimensional shape may provide structural rigidity and an air space. Such a shape may also form partially enclosed cells, such as a honeycomb or egg-carton type structure, that may provide local reactivity and increase the acoustical performance of the thermo-formed acoustic material.

The acoustic material may be provided with a pressure sensitive adhesive (PSA). The PSA may be applied from a roll and laminated to the back side of the acoustic composite layer material (e.g., on the side of the acoustic composite layer opposite the facing layer), which may be performed concurrently with the lamination of the facing layer. A release liner may carry the PSA. Prior to installation of the acoustic material, the release liner may be removed from the pressure sensitive adhesive to allow the composite sound absorber to be adhered to a panel, substrate, or surface. For some acoustic materials intended to be used as input components, for example on a vehicle production line, it is desirable that the acoustic material can be installed quickly and easily. To achieve this, for some applications, it may be beneficial to provide a release liner with a high tear strength that is easy to remove.

The PSA may be provided as part of a tape material comprising: a thin flexible substrate; a PSA substance carried on a single side, of the substrate, the PSA substance being provided along a length of the substrate (e.g., in an intermittent pattern or as a complete layer); and optionally a mesh carried on the single side. The PSA may be coated onto a silicone coated plastic or paper release liner. The PSA may be of the supported design, where the PSA layer may be bonded to a carrier film, and the carrier film may be bonded to the acoustic composite layer. A thin flexible substrate may be located on the side of the PSA layer opposite the carrier film. The end user may then remove the thin flexible substrate (e.g., release liner) to install the part to the target surface. The supported construction may be up to 100% coverage, or the PSA may be supplied in an intermittent pattern. The supported construction may include embedded mesh.

The purpose of the substrate of the tape material is to act as a carrier for the PSA substance so that the PSA substance can be applied (adhered) to the sound absorbing material. The substrate further acts as the release liner and can be subsequently removed by peeling it away, leaving the PSA substance exposed on the side where the substrate used to be. The newly exposed face of the PSA substance can be applied to a target surface, for example such as a panel or surface, to adhere the composite sound absorber to the target surface.

The entire side (e.g., about 100%) of the side of the acoustic material may be coated with the PSA. If provided in an intermittent PSA coating, depending on the size and spacing of the applied portions of the intermittent PSA coating, the percentage of coated area can be varied. The applied area of the coating can vary between about 10 and about 90%, or more specifically about 30% to about 40%, of the area of the substrate, for example.

The intermittent coating may be applied in strips or in another pattern. This can be achieved by hot-melt coating with a slot die, for example, although it can also be achieved by coating with a patterned roller or a series of solenoid activated narrow slot coating heads, for example, and may also include water and solvent based coatings, in addition to hot-melt coating.

Where the PSA coating is applied in strips, the spacing of the strips may vary depending on the properties of the acoustic material. For example, a lighter acoustic material may need less PSA to hold the material in place. A wider spacing or gap between the strips can facilitate easier removal of the substrate, as a person can more readily find uncoated sections that allow an edge of the substrate to be lifted easily when it is to be peeled away to adhere the sound absorbing material to another surface.

By applying the adhesive in an intermittent pattern, such as longitudinal strips, it is possible to still achieve the coating weight desired for a particular application, while saving a large percentage of the PSA resin by coating only some portions of the total area. Thus, it may be possible to use a reduced amount of PSA substance because the sound absorbing material of certain embodiments is a lightweight and porous article that does not require an all-over coating. Lowering the overall amount of PSA used also has the effect of minimizing the toxic emissions and volatile organic compounds (VOC) contributed by the PSA substance used to adhere the sound absorbing material to a target surface. The described acrylic resin used for the PSA also has relatively low VOC content.

The pressure sensitive adhesive substance may be an acrylic resin that is curable under ultraviolet light, such as AcResin type DS3583 available from BASF of Germany. A PSA substance may be applied to substrate in a thickness of about 10 to about 150 microns, for example. The thickness may alternatively be from about 20 to about 100 microns, and possibly from about 30 to about 75 microns, for example.

Other types of PSA substance and application patterns and thicknesses may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive.

Figure 1:
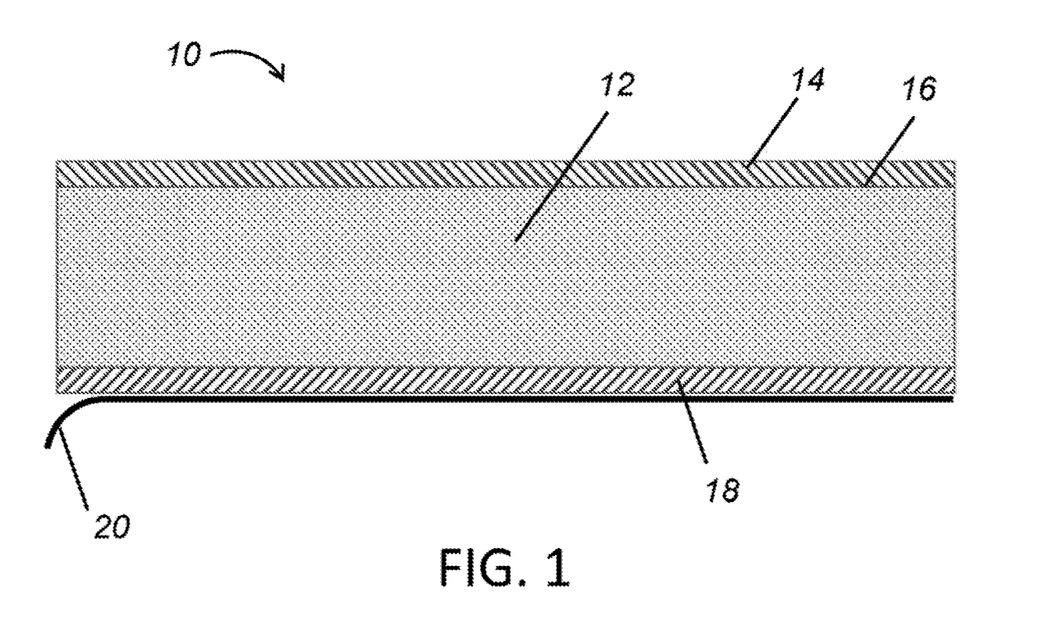
FIG. 1 is a cross-sectional view of a faced nonwoven material in accordance with the present teachings.

Turning now to the figures, FIG. 1 illustrates a cross section of an acoustic material 10, which is a metalized faced acoustic material. The acoustic material 10 comprises an acoustic composite layer 12, which may be a lofted porous bulk absorber. A facing layer 14 is attached to the acoustic composite layer 12 by an adhesive layer 16, which may be a high temperature adhesive layer. On the opposing side of the acoustic composite layer 12 is an optional layer of pressure sensitive adhesive 18. The pressure sensitive adhesive 18 can be exposed by removing the release liner 20, which allows for peel-and-stick functionality so that the acoustic material 10 can be attached to a substrate to provide acoustic and IR reflective properties.

Figure 2:
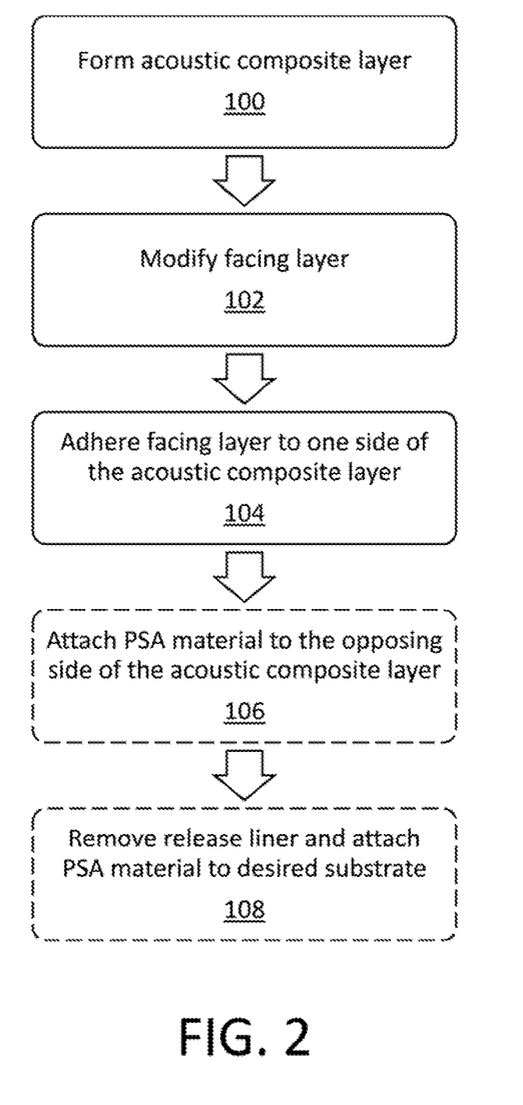
FIG. 2 is a flow chart illustrating a method of assembling a faced nonwoven material in accordance with the present teachings.

FIG. 2 is a flow chart illustrating the steps of assembling and attaching the acoustic material of FIG. 1. Step 100 includes forming and/or providing the acoustic composite layer. This layer may be a lofted porous bulk absorber based on carded/lapped fiber technology or can be any other composite layer(s) that exhibits the desired air flow resistive properties. Step 102 includes modifying the facing layer. Depending on the material of the facing layer, the modification step may include perforating the facing layer so that the facing layer is permeable. The modification step may include metalizing (e.g., aluminizing) the facing layer, particularly if the facing layer is a perforated film (e.g., polyester film, such as PET) or a fibrous permeable fabric. The facing may be metalized or aluminized on the top surface to provide IR radiant heat reflection, which protects the underneath acoustic composite layer (12 of FIG. 1). Step 104 includes adhering the facing layer to one side of the acoustic composite layer. Adhering may be achieved by a high temperature adhesive layer between the facing layer and the acoustic composite layer, laminating, or both. It is important that the adhesive layer not plug the permeable facing so that sound can travel to and be absorbed by the acoustic composite layer. Optionally, pressure sensitive adhesive material may be adhered to the opposing side of the acoustic composite layer, as shown in step 106. The PSA material may have a release liner that can be removed to attach the PSA material (as well as the acoustic composite layer and facing layer) to a substrate, as shown in step 108, which provides peel and stick functionality.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step not intended to foreclose additional elements, ingredients, components or steps.

What is claimed is:

1. An acoustic material comprising:
   a. one or more acoustic composite layers; and
   b. a facing layer,
      wherein the one or more acoustic composite layers are formed of a nonwoven sound absorption material, and wherein at least one of the acoustic composite layers is formed by a vertical lapping process;
      wherein the facing layer is permeable and includes metallic components or a metallized outer surface;
      wherein the facing layer is attached to a top surface of the one or more acoustic composite layers; and
      wherein the acoustic material provides infrared heat reflection and sound absorption.

2. The acoustic material of claim 1, wherein one or more of the acoustic composite layers includes a lofted porous bulk absorber, a short fiber technology-based material, a needle-punched layer, or a combination thereof.

3. The acoustic material of claim 1, wherein the facing layer is made permeable by a plurality of perforations in the facing layer, or material forming the facing layer is inherently permeable.

4. The acoustic material of claim 1, wherein the facing layer is laminated to the one or more acoustic composite layers.

5. The acoustic material of claim 1, wherein the facing layer is a scrim, a fabric, a film, or a foil.

6. The acoustic material of claim 5, wherein the facing layer is a perforated reinforced aluminum foil.

7. The acoustic material of claim 5, wherein the facing layer is a perforated polymeric film that can be metalized.

8. The acoustic material of claim 5, wherein the facing is a fibrous permeable fabric.

9. The acoustic material of claim 1, wherein the facing layer is metalized to provide infrared heat reflection, and wherein the facing layer is metalized by depositing metal atoms onto a surface of the facing layer.

10. The acoustic material of claim 9, wherein the facing layer is aluminized.

11. The acoustic material of claim 1, wherein the facing layer is about 50% IR reflective or greater.

12. The acoustic material of claim 1, wherein the facing layer is attached to the top surface of the one or more acoustic composite layers by an adhesive, and wherein the adhesive does not plug the perforations of the facing layer.

13. The acoustic material of claim 1, wherein the acoustic material is coated with a corrosion resistant coating.

14. The acoustic material of claim 1, further comprising a pressure sensitive adhesive on a rear surface of the one or more acoustic composite layers.

15. The acoustic material of claim 14, wherein the pressure sensitive adhesive includes a removable release liner for adhering the acoustic material to a substrate.

16. A method of assembling an acoustic material comprising the steps of:
 a. forming one or more acoustic composite layers, wherein one or more of the acoustic composite layers is a nonwoven sound absorption material formed by a vertical lapping process;
 b. modifying a facing layer; and
 c. adhering the facing layer to a top side of the one or more acoustic composite layers.

17. The method of claim 16, wherein the modifying step includes metalizing the facing layer by depositing metal atoms onto a surface of the facing layer.

18. The method of claim 17, wherein the metalizing is performed by aluminizing the facing layer.

19. The method of claim 16, wherein the modifying step includes perforating the facing layer or applying an inherently permeable fabric so that the facing, layer is permeable.

20. The method of claim 16, wherein the adhering step includes laminating the facing layer to the one or more acoustic composite layers.

* * * * *